United States Patent
Beausoleil et al.

(10) Patent No.: US 7,828,482 B2
(45) Date of Patent: Nov. 9, 2010

(54) TUNGSTEN CARBIDE ENHANCED BEARING

(75) Inventors: Phillip Beausoleil, Mission Viejo, CA (US); Robert A. Arnold, Port Ludlow, WA (US); Andrew Tyler, Fountain Valley, CA (US); Cleo Whelen, Anaheim, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 486 days.

(21) Appl. No.: 11/842,994

(22) Filed: Aug. 22, 2007

(65) Prior Publication Data

US 2008/0056631 A1    Mar. 6, 2008

Related U.S. Application Data

(60) Provisional application No. 60/840,922, filed on Aug. 28, 2006.

(51) Int. Cl.
*F16C 33/02* (2006.01)
*F16C 23/02* (2006.01)

(52) U.S. Cl. .............. 384/276; 384/129; 384/192; 384/203; 29/898.042

(58) Field of Classification Search .......... 384/192, 384/203, 206–210, 276, 492, 625, 129; 29/898.043, 29/898.046, 898.051, 898.042
See application file for complete search history.

(56) References Cited

U.S. PATENT DOCUMENTS

| | | | | |
|---|---|---|---|---|
| 2,685,545 | A * | 8/1954 | Sindeband | 29/898.12 |
| 2,974,986 | A * | 3/1961 | Hazard | 403/76 |
| 3,379,464 | A * | 4/1968 | Bradshaw | 403/39 |
| 3,683,474 | A * | 8/1972 | Young, Jr. | 29/898.043 |
| 3,685,878 | A | 8/1972 | Orkin | |
| 3,711,171 | A * | 1/1973 | Orkin et al. | 384/297 |
| 4,053,665 | A * | 10/1977 | Orkin et al. | 384/203 |
| 4,375,940 | A * | 3/1983 | Lovera et al. | 416/114 |
| 5,364,191 | A * | 11/1994 | Gruber | 384/206 |
| 5,463,811 | A * | 11/1995 | Aureli et al. | 29/898.046 |
| 5,531,079 | A * | 7/1996 | Tatematsu et al. | 384/624 |
| 5,725,315 | A * | 3/1998 | Pace | 384/209 |

(Continued)

FOREIGN PATENT DOCUMENTS

FR    2868029 A1 *  9/2005

(Continued)

OTHER PUBLICATIONS

European Search Report for 07115002.3, dated Aug. 8, 2008.

*Primary Examiner*—Marcus Charles
(74) *Attorney, Agent, or Firm*—Michaud-Kinney Group LLP

(57) ABSTRACT

A plain bearing has two components, each having a bearing surface; the bearing surfaces being in sliding engagement with each other. The bearing may be a spherical plain bearing having an outer ring that has a concave bearing surface and an inner ring that has a convex bearing surface. One of the bearing surfaces comprises a layer comprising tungsten carbide. One component may have spaced-apart seating surfaces for engaging a moving structure and a generally concave interior that includes an internal rib between the seating surfaces. A spherical plain bearing can be made by providing an outer ring and an inner ring includes an internal rib, and disposing the outer ring around the inner ring with the convex bearing surface engaging the concave bearing surface. The bearing may be used in a swashplate assembly.

2 Claims, 3 Drawing Sheets

U.S. PATENT DOCUMENTS

| | | | | |
|---|---|---|---|---|
| 6,004,037 A | * | 12/1999 | Harris et al. | 384/206 |
| 6,033,182 A | * | 3/2000 | Rampal | 416/140 |
| 6,074,168 A | * | 6/2000 | Rampal et al. | 416/114 |
| 6,209,206 B1 | * | 4/2001 | Harris et al. | 29/898.043 |
| 6,280,141 B1 | | 8/2001 | Rampal et al. | |
| 6,325,326 B1 | * | 12/2001 | Pancotti | 244/17.25 |
| 7,067,201 B2 | * | 6/2006 | Ellis et al. | 428/668 |
| 7,172,343 B2 | * | 2/2007 | Kinno et al. | 384/492 |
| 7,220,098 B2 | * | 5/2007 | Bruce et al. | 415/160 |
| 7,396,017 B2 | * | 7/2008 | Orlowski et al. | 384/206 |
| 7,543,992 B2 | * | 6/2009 | Bruce et al. | 384/209 |
| 2003/0095729 A1 | | 5/2003 | Post et al. | |
| 2003/0176252 A1 | * | 9/2003 | Tsujii et al. | 474/213 |
| 2006/0120644 A1 | * | 6/2006 | Smith | 384/276 |

FOREIGN PATENT DOCUMENTS

| | | | |
|---|---|---|---|
| GB | 1351259 | | 4/1974 |
| GB | 2281601 A | * | 3/1995 |
| JP | 05209250 A | * | 8/1993 |

* cited by examiner

TUNGSTEN CARBIDE ENHANCED BEARING

CROSS-REFERENCE TO RELATED APPLICATION

This application claims the benefit of U.S. provisional application No. 60/840,922, filed Aug. 28, 2006, which is hereby incorporated herein by reference, in its entirety.

FIELD OF THE INVENTION

This invention pertains to plain bearings and in particular to spherical plain bearings.

BACKGROUND

A plain bearing has two components that have bearing surfaces in mutual sliding engagement with each other and that define a load zone between the components. For example, one component of a spherical plain bearing is an outer ring having a concave bearing surface and the other component is an inner ring having a convex bearing surface. The inner ring is disposed within the outer ring and the rings are sized and configured so that their bearing surfaces are in sliding engagement with each other. The inner ring and the outer ring have seating surfaces for connecting to structures whose relative motion is to be accommodated by the bearing.

Commonly, bearings are made from steel. To extend the life of the bearing, it is known to provide lubricant in the load zone to reduce wear on the bearing surfaces.

Rotary wing aircraft, such as helicopters, provide unique environments for the use of spherical plain bearings due to the harsh conditions helicopters impose on the bearings and the general practice of providing bearings of reduced weight.

Based on the foregoing, it is the general object of this invention to provide a plain bearing that improves upon, or overcomes the problems and drawbacks of, prior art plain bearings.

SUMMARY OF THE INVENTION

The present invention resides in one aspect in a plain bearing that comprises a first component having a first bearing surface and a second component having a second bearing surface in sliding engagement with the first bearing surface. The first component comprises an internal rib, and at least one of the first bearing surface and the second bearing surface comprises a layer comprising tungsten carbide.

In a particular embodiment, the first component comprises an inner ring having a convex bearing surface and the second component comprises an outer ring having a concave bearing surface. The outer ring is disposed about the inner ring with the convex bearing surface in sliding engagement with the concave bearing surface. The inner ring may have two spaced-apart seating surfaces for engaging a moving structure and an internal rib between the two seating surfaces. The convex bearing surface comprises the layer of tungsten carbide.

According to another aspect, the invention provides a swashplate assembly for a rotary wing aircraft. The swashplate assembly comprises a spherical plain bearing that has an inner ring having a convex bearing surface and an outer ring having a concave bearing surface in sliding engagement with the convex bearing surface. A first swashplate engages the outer ring of the bearing and a second swashplate is rotatably mounted on the first swashplate. The convex bearing surface of the bearing comprises a layer comprising tungsten carbide, and the inner ring comprises an internal rib.

The invention also has a method aspect that provides a method of making a spherical plain bearing. The method comprises providing an inner ring having a body portion that has a convex surface and an internal rib and applying a layer of tungsten carbide on the body portion to provide a convex bearing surface. An outer ring having a concave bearing surface is provided. The outer ring is disposed around the inner ring with the convex bearing surface in sliding engagement with the concave bearing surface.

DETAILED DESCRIPTION OF THE INVENTION

In accordance with this invention, the bearing surface on at least one component of a plain bearing comprises a tungsten carbide (WC) layer for sliding engagement with the bearing surface of the other component. The WC layer is applied onto the body of the component by a known manner, the body being the portion of the component apart from any WC layer and/or a seat liner thereon. For example, the WC layer may be applied by a HVOF (High Velocity Oxygen/Fuel) thermal spray process optionally in accordance with SAE Aerospace Materials Specification AMS 2447. The WC layer increases hardness and facilitates the creation of a very smooth surface finish (as may be achieved by grinding and/or polishing the WC layer), thereby aiding in the reduction of friction and wear between the bearing surfaces. Optionally, the WC layer may contain additives in addition to tungsten carbide. For example, the WC layer may comprise cobalt (Co). In a particular embodiment, the WC layer comprises about 85% WC and about 15% cobalt, by weight. Optionally, an epoxy seal may be applied to the component after the WC layer is ground and polished.

At least one component of the bearing may be made from a lightweight metal alloy such as aluminum 7075-T6/T73/T651 per AMS-QQ-A-225/9 or 7075-T651 per AMS-QQ-A-250/12 or 7075-T6 per AMS-QQ-A-367 or other aluminum alloy, steel alloy, nickel alloy, cobalt alloy, etc.

The bearing has seating surfaces for connecting to structures whose relative motion is to be accommodated by the bearing. In another aspect of the invention, at least one component of the bearing may be configured to have a strengthening rib. For example, a bearing component may be configured to engage a rotating member at two space-apart seating surfaces, and between the two seating surfaces, the component may be configured to have a strengthening rib.

One or both of the components of the bearing may have a self-lubricating seat liner applied to the body of the component to provide a seating surface. The seat liner may be made from a friction-reducing ("self-lubricating") material such as polytetrafluoroethylene (PTFE), nylon, etc., optionally in the form of a fabric. If a bearing component comprises both a WC layer and a seat liner, the seat liner is preferably applied to the body of the component after the WC layer is applied. Before the seat liner is applied but after the WC layer is applied, the surface to which the seat liner will be applied may optionally be treated according to AMS-C-5541, CL 1A.

A bearing as described herein is useful in various applications. In some embodiments, such bearing can be used as a self-aligning, spherical, sliding bearing for a helicopter swashplate assembly. The bearing may be mounted on the external stationary mast of the drive shaft system to accommodate movement of the stationary swashplate relative to the stationary mast.

Figure 1:
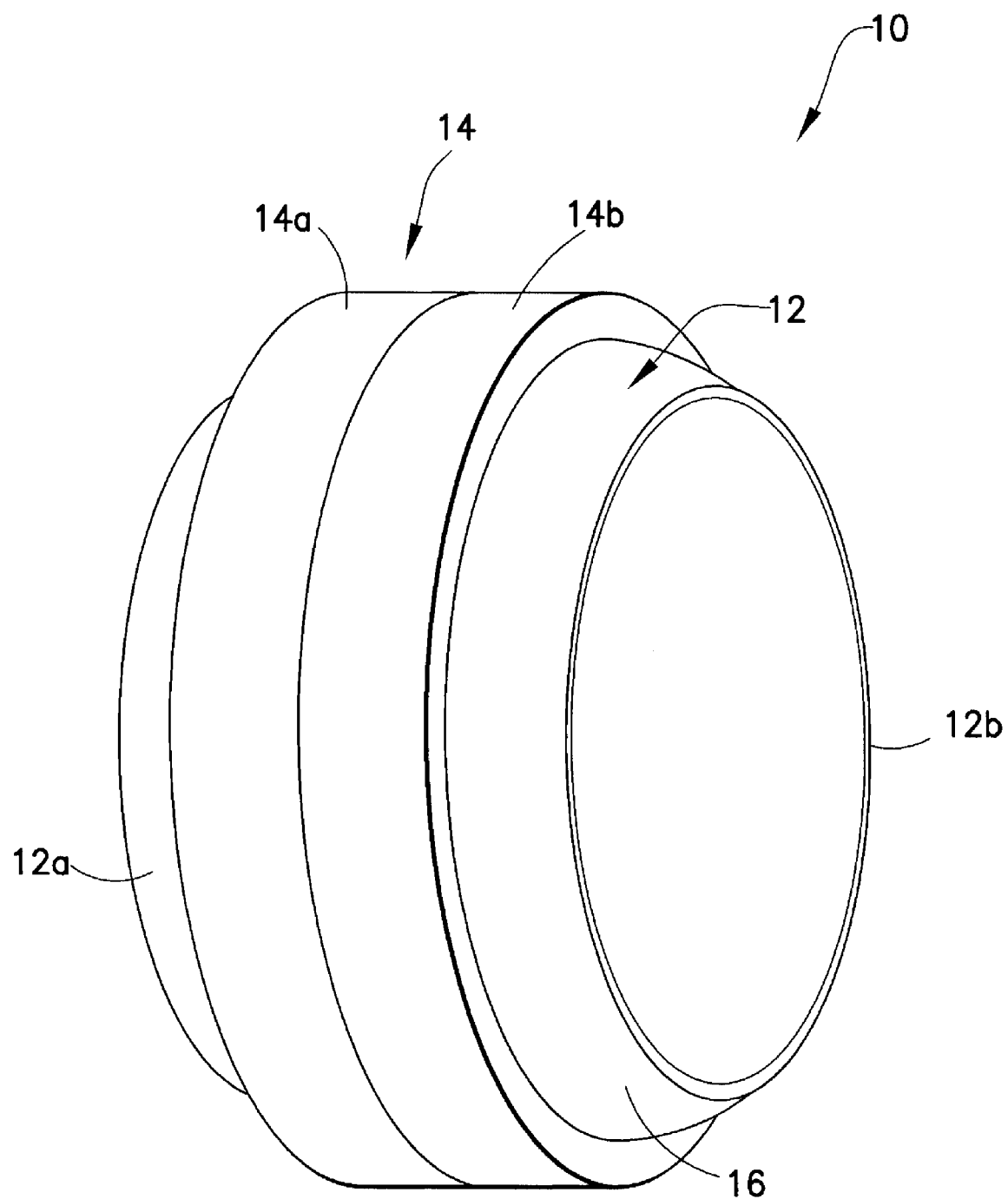
FIG. 1 is a schematic perspective view of a bearing according to one embodiment of this invention.
Figure 2:
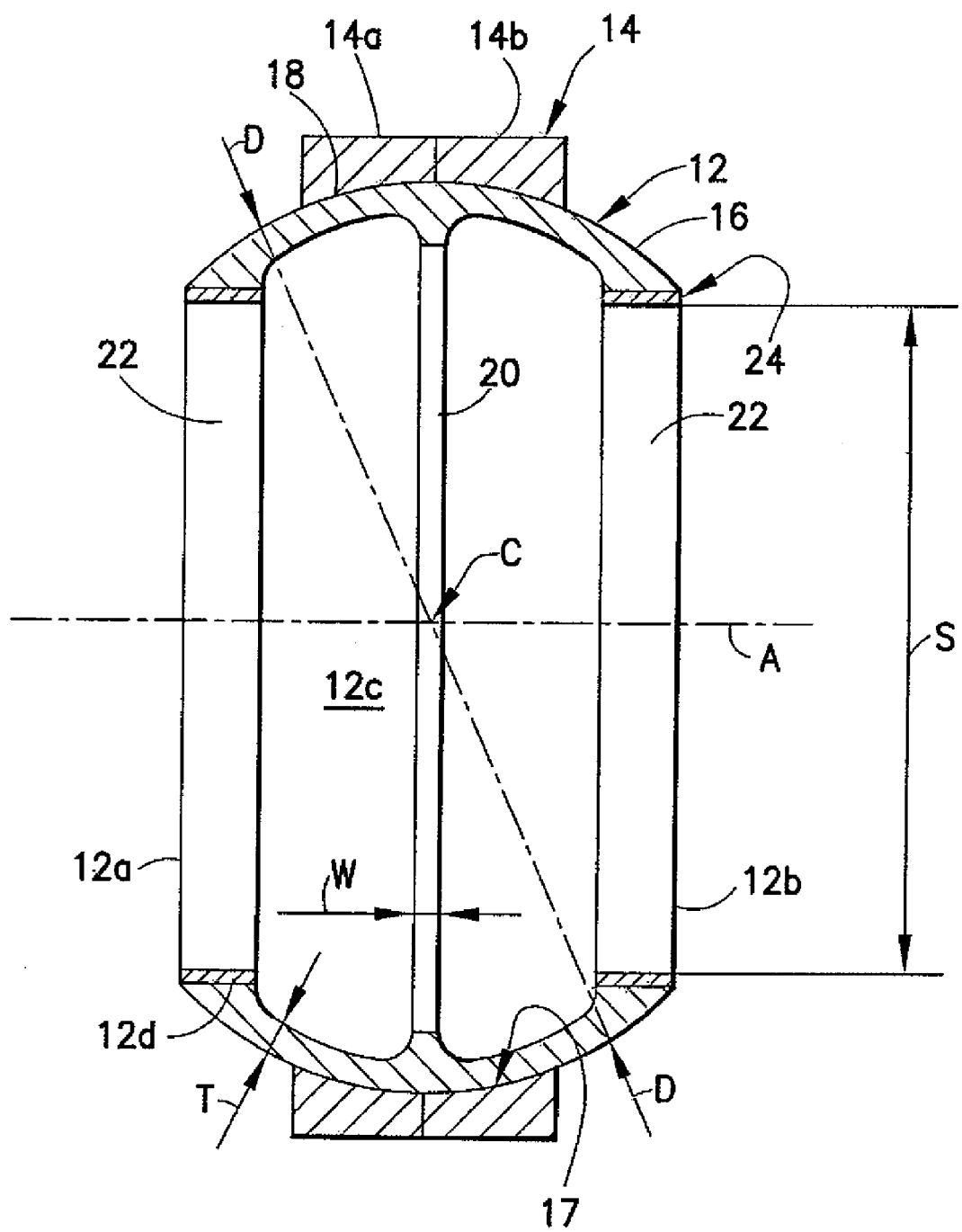
FIG. 2 is a schematic cross-sectional view of the bearing of FIG. 1.

According to one particular embodiment shown in FIGS. 1 and 2, a bearing 10 is a spherical plain bearing that comprises an inner ring 12 as a first component and an outer ring 14 as a second component. The inner ring 12 comprises bearing surface 16 that has a convex curvature, and the outer ring 14 comprises a bearing surface 17 (FIG. 2) that has a concave curvature. The outer ring 14 is disposed about the inner ring 12 and the inner ring 12 and the outer ring 14 are sized and configured so that their respective bearing surfaces 16, 17 are in sliding engagement with each other. The outer ring 14 is formed from two mating parts 14a, 14b so that the outer ring 14 can be assembled around the inner ring 12, as is known in the art. The inner ring 12 has a central axis A (FIG. 2) extending therethrough, and two ends 12a and 12b that are opposite each other on the inner ring 12 along axis A. The two ends 12a and 12b are open to provide an aperture that extends axially through the inner ring 12 with a diameter S at each end 12a and 12b.

The body 12c of the inner ring 12 has a convex exterior surface. A WC layer that comprises 85% WC and 15% Co by weight is disposed on the convex exterior surface of the body 12c to provide the convex bearing surface 16. The WC layer may be about 0.002 to about 0.007 inch (in.) (about 0.05 to about 0.18 millimeter (mm)) thick. Preferably, the WC layer should not extend beyond the exterior convex curvature of the inner ring 12. The body 12c of the inner ring 12 is formed from 7075-T6/T73 aluminum alloy. The outer ring 14 is formed from 7075-T6/T73 aluminum alloy as well.

The inner ring 12 includes a rib 20 (FIG. 2) between ends 12a and 12b. The rib 20 has an inner diameter that is less that the inner diameter S as a result of the generally concave interior configuration of the inner ring 12. The rib 20 extends circumferentially around the interior of the inner ring 12 and adds structural strength to the inner ring 12, which helps to prevent distortion of the inner ring 12 during the process of applying the WC layer.

The bearing 10 has seating surfaces at which the bearing is joined to structures whose relative motion is to be accommodated by the bearing. For example, the inner ring 12 has two seating surfaces 22 that are cylindrical in configuration and that face towards the central axis A. Seating surfaces 22 may engage a first structure such as a shaft, the motion of which (relative to a second structure mounted to the outer ring 14) is to be accommodated by the bearing. The body 12c of the inner ring 12 provides liner mounting surfaces 12d where seat liners 24 are mounted. The seat liners 24 provide the seating surfaces 22 and comprise TEFLON® polytetrafluoroethylene (PTFE) fabric that is about 0.01 to about 0.03 in. (about 0.25 to about 0.76 mm) thick and which is disposed so that the direction of the fabric weave is aligned with the axis A. The exterior surfaces of the outer ring 14 can also serve as seating surfaces by which the bearing 10 is mounted to a second structure.

In a specific embodiment, the bearing surface 16 of the inner ring 12 defines a diameter D of about 9.25 in. (about 23.5 centimeters (cm)) and has a WC layer that is about 0.004 in. (about 0.1 mm) thick to provide the bearing surface 16. The seat liner 24 is about 0.03 in. (about 0.76 mm) thick and provides seating surfaces 22 that have inner diameters S of about 7.5 in. (about 19 cm). The rib 20 has a width W of about 0.15 in. (about 3.8 mm) and an internal diameter of about 8.5 in. (about 21.6 cm), which is greater than the diameter of the seating surfaces 22. Between the rib 20 and the ends 12a and 12b, the inner ring 12 has a thickness T of about 0.125 in. (about 3.17 mm).

Figure 3:
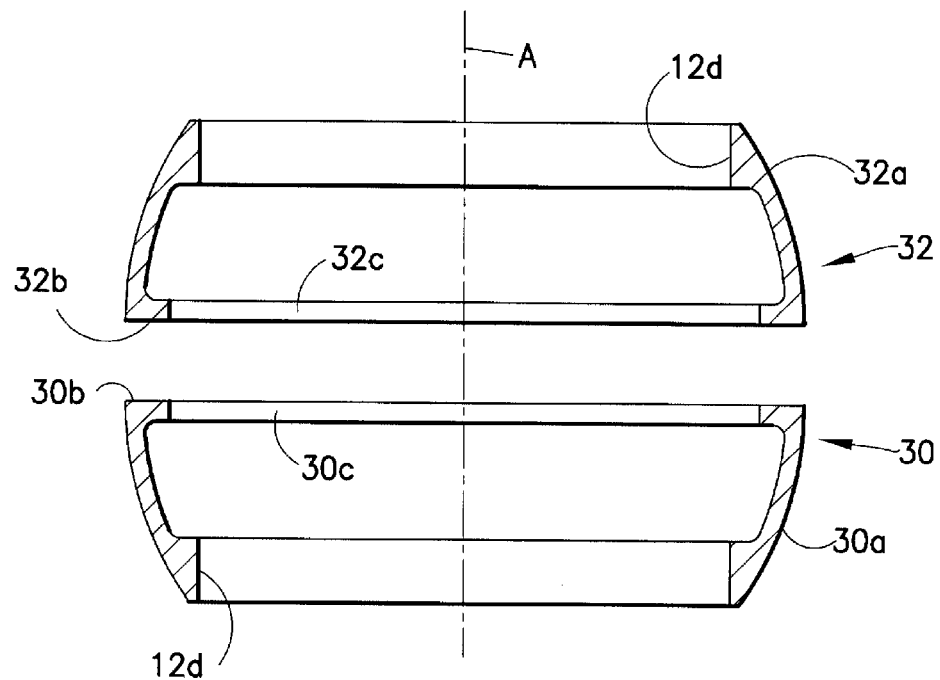
FIG. 3 is a schematic exploded view of two parts that form an inner ring of a spherical plain bearing.

In an optional embodiment, the inner ring 12 comprises two inner ring members 30 and 32, as shown in FIG. 3 (where the rings are rotated 90° in orientation relative to FIG. 2). The inner ring members 30 and 32 each provide a convex partial bearing surface 30a and 32a. The inner ring members 30 and 32 are each annular about the common central axis A and are adjacent to each other with mutually contiguous sides 30b and 32b. Each of the two sides 30b and 32b comprises a flange 30c, 32c that extends away from their respective partial bearing surface 30a, 32a towards the central axis A. The inner ring members are joined together at sides 30b, 32b to provide the inner ring 12, and when this is done, the flanges 30c, 32c cooperate to provide the rib 20.

In use, the inner ring 12 and the outer ring 14 are each mounted to respective first and second structures to accommodate motion between the structures. For example, the outer ring 14 may be mounted in a housing that comprises a first structure, and second structure such as a shaft that moves relative to the housing in a manner accommodated by the bearing 10 is mounted in the seating surfaces 22. The WC layer and the friction-reducing seat liner at the seating surface each help make the bearing more forgiving, reduces friction and extends bearing life. As a result, a bearing comprising a WC layer can be lighter than other bearings designed to provide the same life and bearing capacity.

Figure 4:
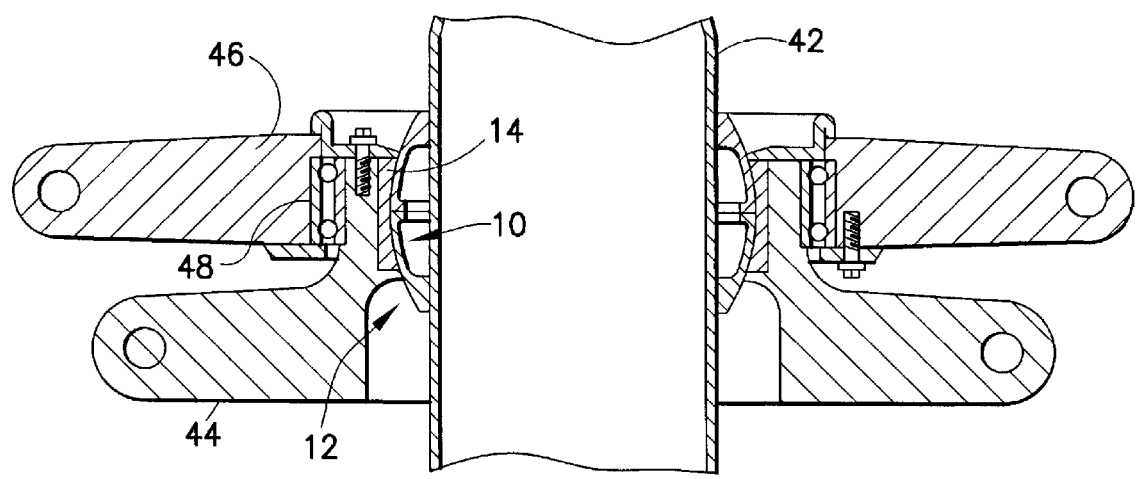
FIG. 4 is a schematic cross-sectional view of the bearing of FIG. 1 in a helicopter swashplate assembly.

The bearing 10 finds use in various applications, including mounting the swashplate assembly of a helicopter on the drive shaft system, as shown in FIG. 4. The swashplate assembly 40 includes the bearing 10, a stationary swashplate 44 and a rotating swashplate 46. The stationary swashplate 44 is mounted on the outer ring 14 of the bearing 10. The bearing 10 is mounted on the stationary mast 42 of the helicopter drive shaft system, with the inner ring 14 engaging the stationary mast 42 at the seating surfaces 22. The rotating swashplate 46 is rotatably mounted on the stationary swashplate 44 by a roller bearing 48 in a known manner.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A plain bearing comprising:
   an inner ring comprising:
      an internal rib,
      a convex bearing surface, and
      two coaxially adjacent inner ring members having mutually contiguous sides, wherein each of the two inner ring members has a radially-extending flange at the contiguous side such that the radially extending flanges cooperate to provide the internal rib, the inner ring further having two spaced-apart seating surfaces for engaging a moving structure, wherein the internal rib is disposed between the two seating surfaces; and an outer ring having a concave bearing surface, the outer ring being disposed about the inner ring with the convex bearing surface in sliding engagement with the concave bearing surface, wherein at least one of the convex bearing surface and the concave bearing surface comprises a layer comprising tungsten carbide.

2. A method of making a spherical plain bearing, the method comprising:

providing an inner ring having a body portion that has a convex surface and an internal rib;

applying a layer of tungsten carbide on the body portion to provide a convex bearing surface;

providing an outer ring having a concave bearing surface; and disposing the outer ring around the inner ring with the convex bearing surface in sliding engagement with the concave bearing surface, wherein providing the inner ring comprises joining two coaxially adjacent inner ring members, wherein each of the two inner ring members has a radially-extending flange and wherein the ring members are joined such that the radially extending flanges are contiguous with each other to cooperate to provide the internal rib.

\* \* \* \* \*